United States Patent
Bruck

(10) Patent No.: US 9,358,629 B1
(45) Date of Patent: Jun. 7, 2016

(54) TUNGSTEN SUBMERGED ARC WELDING USING POWDERED FLUX

(71) Applicant: Gerald J. Bruck, Oviedo, FL (US)

(72) Inventor: Gerald J. Bruck, Oviedo, FL (US)

(73) Assignee: SIEMENS ENERGY, INC., Orlando, FL (US)

( * ) Notice: Subject to any disclaimer, the term of this patent is extended or adjusted under 35 U.S.C. 154(b) by 504 days.

(21) Appl. No.: 14/034,609

(22) Filed: Sep. 24, 2013

(51) Int. Cl.
  *B23K 25/00* (2006.01)
  *B23K 9/18* (2006.01)
  *B23K 9/167* (2006.01)

(52) U.S. Cl.
  CPC .............. *B23K 9/182* (2013.01); *B23K 9/167* (2013.01); *B23K 25/00* (2013.01)

(58) Field of Classification Search
  CPC ........................................................ B23K 25/05
  USPC ................................. 219/73.11; 427/596, 597
  See application file for complete search history.

(56) References Cited

U.S. PATENT DOCUMENTS

| | | | |
|---|---|---|---|
| 6,696,176 B2 | 2/2004 | Allen et al. | |
| 7,775,414 B2 | 8/2010 | Ditzel et al. | |
| 7,915,566 B2 | 3/2011 | Arjakine et al. | |
| 8,901,455 B2 * | 12/2014 | Schaeffer | B23K 9/186 219/145.22 |
| 9,186,724 B2 * | 11/2015 | Bruck | B22D 19/10 |
| 9,272,363 B2 * | 3/2016 | Bruck | B23P 6/007 |
| 2010/0068559 A1 | 3/2010 | Muthukumaran et al. | |
| 2010/0116793 A1 | 5/2010 | Grüger et al. | |
| 2013/0142965 A1 | 6/2013 | Bruck et al. | |

FOREIGN PATENT DOCUMENTS

| DE | 236470 A1 | 6/1986 |
|---|---|---|
| DE | 102004010085 B3 | 7/2007 |

* cited by examiner

*Primary Examiner* — Samuel M Heinrich

(57) ABSTRACT

A tungsten submerged arc welding process wherein a non-consumable electrode (18) provides an arc (16) under a protective bed of flux powder (26), thereby eliminating the need for an inert cover gas supply. The arc melts a feed material in the form of alloy powder (22) or filler wire (40) along with a surface of a substrate (12) to form a layer of cladding material (10, 32) covered by a layer of slag (20, 44). The flux and slag function to shape the deposit, to control cooling, to scavenge contaminants and to shield the deposit from reaction with air, thereby facilitating the deposit of previously unweldable superalloy materials.

20 Claims, 2 Drawing Sheets

TUNGSTEN SUBMERGED ARC WELDING USING POWDERED FLUX

FIELD OF THE INVENTION

This invention relates generally to the field of metals joining, and more particularly to the welding clad buildup and repair of superalloy materials.

BACKGROUND OF THE INVENTION

Welding processes vary considerably depending upon the type of material being welded. Some materials are more easily welded under a variety of conditions, while other materials require special processes in order to achieve a structurally sound joint without degrading the surrounding substrate material.

Common arc welding generally utilizes a consumable electrode as the feed material. In order to provide protection from the atmosphere for the molten material in the weld pool, an inert cover gas or a flux material may be used when welding many alloys including, e.g. steels, stainless steels, and nickel based alloys. Inert and combined inert and active gas processes include gas tungsten arc welding (GTAW), also known as tungsten inert gas (TIG) welding or wolframite inert gas (WIG) welding or Heliarc® welding, and gas metal arc welding (GMAW), also known as metal inert gas (MIG) welding or metal active gas (MAG) welding. Flux protected processes include submerged arc welding (SAW) where flux is commonly fed to the welding location, flux cored arc welding (FCAW) where the flux is included in the core of the electrode, and shielded metal arc welding (SMAW) where the flux is coated on the outside of the filler electrode.

The use of energy beams as a heat source for welding is also known. For example, laser energy has been used to melt pre-placed stainless steel powder onto a carbon steel substrate with powdered flux material providing shielding of the melt pool. The flux powder may be mixed with the stainless steel powder or applied as a separate covering layer. To the knowledge of the inventors, flux materials have not been used when welding superalloy materials.

It is recognized that superalloy materials are among the most difficult materials to weld due to their susceptibility to weld solidification cracking and strain age cracking. The term "superalloy" is used herein as it is commonly used in the art; i.e., a highly corrosion and oxidation resistant alloy that exhibits excellent mechanical strength and resistance to creep at high temperatures. Superalloys typically include a high nickel or cobalt content. Examples of superalloys include alloys sold under the trademarks and brand names Hastelloy, Inconel alloys (e.g. IN 738, IN 792, IN 939), Rene alloys (e.g. Rene N5, Rene 80, Rene 142), Haynes alloys, Mar M, CM 247, CM 247 LC, C263, 718, X-750, ECY 768, 282, X45, PWA 1483 and CMSX (e.g. CMSX-4) single crystal alloys.

Weld repair of some superalloy materials has been accomplished successfully by preheating the material to a very high temperature (for example to above 1600° F. or 870° C.) in order to significantly increase the ductility of the material during the repair. This technique is referred to as hot box welding or superalloy welding at elevated temperature (SWET) weld repair, and it is commonly accomplished using a manual GTAW process. However, hot box welding is limited by the difficulty of maintaining a uniform component process surface temperature and the difficulty of maintaining complete inert gas shielding, as well as by physical difficulties imposed on the operator working in the proximity of a component at such extreme temperatures.

Some superalloy material welding applications can be performed using a chill plate to limit the heating of the substrate material; thereby limiting the occurrence of substrate heat affects and stresses causing cracking problems. However, this technique is not practical for many repair applications where the geometry of the parts does not facilitate the use of a chill plate.

FIG. 3 is a conventional chart illustrating the relative weldability of various alloys as a function of their aluminum and titanium content. Alloys such as Inconel® IN718 which have relatively lower concentrations of these elements, and consequentially relatively lower gamma prime content, are considered relatively weldable, although such welding is generally limited to low stress regions of a component. Alloys such as Inconel® IN939 which have relatively higher concentrations of these elements are generally not considered to be weldable, or can be welded only with the special procedures discussed above which increase the temperature/ductility of the material and which minimize the heat input of the process. A dashed line 80 indicates a recognized upper boundary of a zone of weldability. The line 80 intersects 3 wt. % aluminum on the vertical axis and 6 wt. % titanium on the horizontal axis. Alloys outside the zone of weldability are recognized as being very difficult or impossible to weld with known processes, and the alloys with the highest aluminum content are generally found to be the most difficult to weld, as indicated by the arrow.

It is also known to utilize selective laser melting (SLM) or selective laser sintering (SLS) to melt a thin layer of alloy powder particles onto an alloy substrate. The melt pool is shielded from the atmosphere by applying an inert gas, such as argon, during the laser heating. These processes tend to trap rather than eliminate or remove the oxides (e.g. aluminum and chromium oxides) that are adherent on the surface of the particles within the layer of deposited material, resulting in porosity, inclusions and other defects associated with the trapped oxides. Post process hot isostatic pressing (HIP) is often used to collapse these voids, inclusions and cracks in order to improve the properties of the deposited coating.

For some superalloy materials in the zone of non-weldability there is no known acceptable welding or repair process. Furthermore, as new and higher alloy content superalloys continue to be developed, the challenge to develop commercially feasible joining processes for superalloy materials continues to grow.

BRIEF DESCRIPTION OF THE DRAWINGS

The invention is explained in the following description in view of the drawings that show.

DETAILED DESCRIPTION OF THE INVENTION

The present inventor has developed a materials joining process that can be used successfully to join and/or repair the most difficult to weld superalloy materials. The invention incorporates a non-consumable electrode to provide heat energy via an arc, as is common in tungsten inert gas (TIG) welding, but avoids the need for supplying an inert cover gas by burying the arc under a powdered flux material. Embodiments of the inventive process advantageously apply a powdered flux material over a superalloy substrate during a melting and re-solidifying process. The powdered flux material is effective to provide impurity cleansing, atmospheric shielding, bead shaping, and cooling temperature control in order to accomplish crack-free joining of superalloy materials without the necessity for high temperature hot box welding or the use of a chill plate or the use of inert shielding gas.

Figure 1:
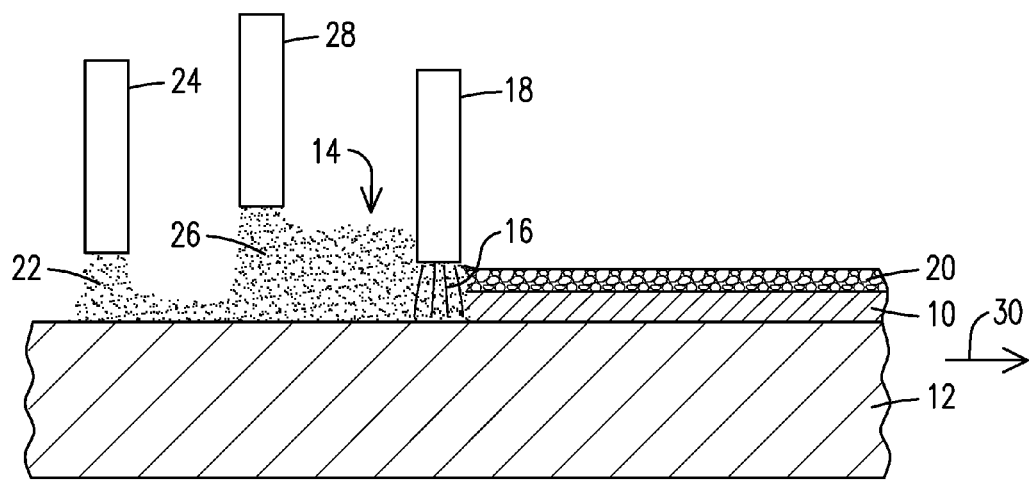
FIG. 1 illustrates a cladding process in accordance with an embodiment of the invention.

FIG. 1 illustrates an embodiment of the present invention where a layer of cladding 10 of a superalloy material is being deposited onto a superalloy substrate material 12 at ambient room temperature without any preheating of the substrate material 12 or the use of a chill plate. The substrate material 12 may form part of a gas turbine engine blade, for example, and the cladding process may be part of a repair procedure in some embodiments. A layer of granulated powder 14 is fed onto the substrate 12, and an arc 16 is generated between a non-consumable electrode 18 and the substrate 12 and is traversed across the layer of powder 14 to melt the powder and to form the layer of cladding 10 covered by a layer of slag 20. The cladding 10 and slag 20 are formed from the layer of powder 14 which includes a layer of powdered superalloy material 22, delivered by an alloy powder feeder 24, covered by a layer of powdered flux material 26, delivered by a flux powder feeder 28. The electrode is positioned so that the arc 16 is within the layer of flux material 26 but above the layer of superalloy material 22. In other embodiments, a layer of mixed alloy and flux powder or a layer of composite particles containing both alloy and flux may be used. The relative movement of the substrate 12 in relation to the powder feeders 24, 28 and electrode 18 is indicated by arrow 30.

The flux material 26 and resultant layer of slag 20 provide a number of functions that are beneficial for preventing cracking of the cladding 10 and the underlying substrate material 12. First, they function to shield both the region of molten material and the solidified (but still hot) cladding material 10 from the atmosphere in the region downstream of the arc 16. The slag floats to the surface to separate the molten or hot metal from the atmosphere, and the flux may be formulated to produce a shielding gas in some embodiments, thereby avoiding the use of expensive and increasingly rare inert gas. Second, the slag 20 acts as a blanket that allows the solidified material to cool slowly and evenly, thereby reducing residual stresses that can contribute to post weld reheat or strain age cracking. Third, the slag 20 helps to shape the pool of molten metal to keep it close to a desired ⅓ height/width ratio. Fourth, the flux material 26 provides a cleansing effect for removing trace impurities such as sulfur and phosphorous that contribute to weld solidification cracking. Such cleansing includes deoxidation of the metal powder. Additionally, the flux may be formulated to compensate for loss of volatized elements during processing or to actively contribute elements to the deposit that are not otherwise provided by the metal powder itself. Together, these process steps produce crack-free deposits of superalloy cladding on superalloy substrates at room temperature for materials that heretofore were believed only to be joinable with a hot box process or through the use of a chill plate.

Figure 2:
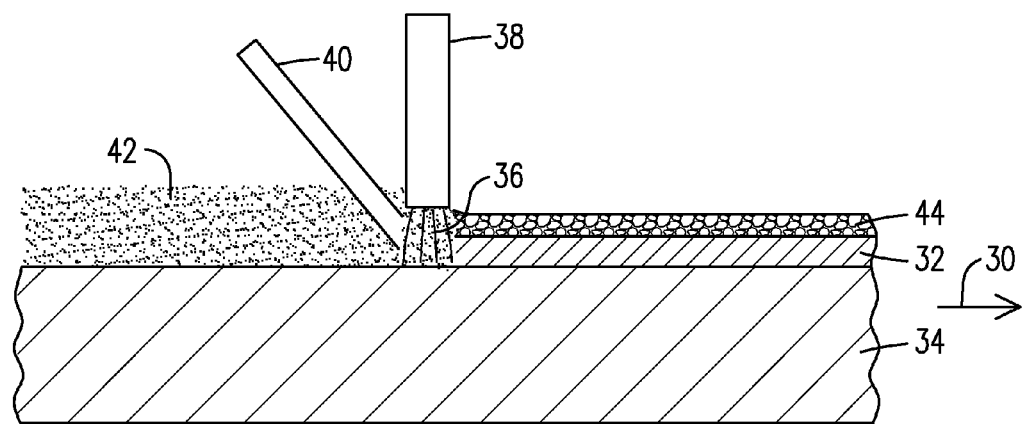
FIG. 2 illustrates an alternative cladding process in accordance with an embodiment of the invention.
Figure 3:
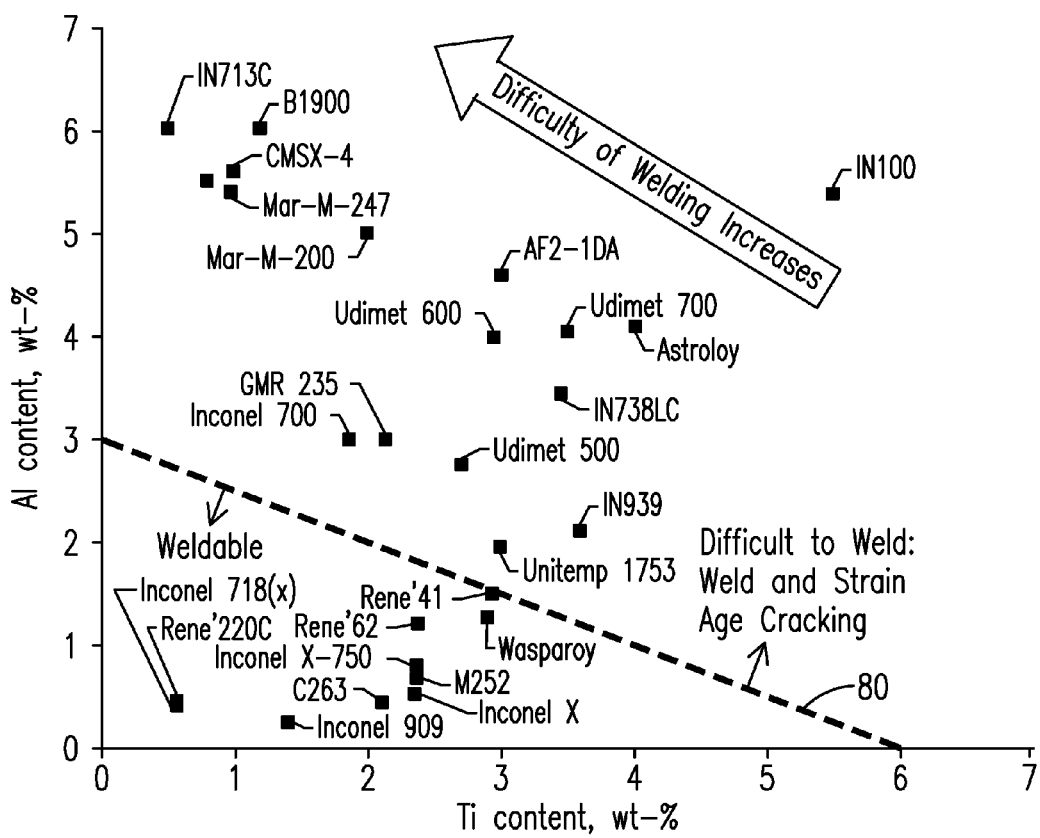
FIG. 3 is a prior art chart illustrating the relative weldability of various superalloys.

FIG. 2 illustrates another embodiment of the invention where a layer of cladding 32 is deposited onto a substrate 34 using an arc 36 from a non-consumable electrode 38. In this embodiment, material to be deposited is fed to the arc 36 in the form of a filler material 40 such as a wire or strip, and the arc is submerged under a layer of powder 42 that is pre-placed or fed onto the substrate in a continuous process. The powder 42 may be just flux material, or it may be a mixture of flux and alloy particles, or it may be composite particles containing flux and alloy material. The cladding 32 and substrate 34 may be the same or different superalloy materials or any other desired material, and the process described herein may be used to deposit metal alloys, ceramics, cermets or mixed layers of material. The flux material may be neutral, i.e. it does not contribute to the deposited cladding, or it may be additive (i.e. active flux), i.e. it contains constituent(s) that transfer to the cladding. The filler wire 40 may be pre-heated in some embodiments.

The powder feed equipment and electrodes used for the processes illustrated in FIGS. 1 and 2 are commercially available. A standard TIG welding equipment may be used but with the inert gas supply of the nozzle being inactive, or with inert gas being supplied while the electrode is energized but at a rate of flow below normal TIG welding flow rates and effective only for cooling those portions of the electrode extending above the flux powder bed. The rate of deposit of material achievable with this invention exceeds that achievable with laser melted powder processes due to the relatively higher energy input achievable with an electrode. Other features commonly practiced with gas tungsten arc welding, such as pulsed current welding and magnetic arc oscillation, are possible with this invention. The invention is adaptable to manual or automatic welding. Advantageously, the welder or welding equipment operator does not require shielding from the arc, as is common with TIG welding, because the arc is buried under the layer of flux material.

Typical powdered prior art flux materials have particle sizes ranging from 0.5-2 mm, for example. However, powdered alloy material may have a particle size range of from 0.02-0.04 mm or 0.02-0.08 mm or other sub-range therein. It may be advantageous for the powdered alloy material and the powdered flux material to have overlapping mesh size ranges, or to have the same mesh size range in order to facilitate mixing and feeding of the powders and to provide improved flux coverage during the melting process.

While it is difficult or impossible to form some superalloy materials into wire or strip form, materials such as pure nickel or nickel-chromium or nickel-chromium-cobalt are readily available in those forms. In the embodiment of FIG. 2, the filler wire 40 and powder 42 may be advantageously selected such that the layer of cladding material 32 has the composition of a desired superalloy material. The filler wire 40 may be only an extrudable subset of elements of a composition of elements defining a desired superalloy material, and the powder 42 may include elements that complement the elements in the wire 40 to complete the composition of elements defining the desired superalloy material. Still alternately, the filler wire 40 may be a composite wire with core material of metal and/or flux constituents as is known in flux cored arc welding. The filler wire 40 and any metal material in the powder 42 are combined in the melt pool to form the repaired surface of a desired superalloy material 32. As in FIG. 1, the process produces a layer of slag 44 that protects, shapes and thermally insulates the layer of cladding material 32.

The present invention allows the amount of any element included in the powder or feed material to be in excess of the amount of that element desired in the deposited material to compensate for any loss to the environment.

Repair processes for superalloy materials in accordance with embodiments of the present invention may include preparing the superalloy material surface to be repaired by grinding as desired to remove defects, cleaning the surface, then pre-placing or feeding a layer of powdered material containing flux material onto the surface, then traversing an electrode across the surface to melt the powder and an upper layer of the surface into a melt pool having a floating slag layer, then allowing the melt pool and slag to solidify. The melting functions to heal any surface defects at the surface of the substrate, leaving a renewed surface upon removal of the slag typically by known mechanical and/or chemical processes. The powdered material may be only flux material, or for embodiments where a layer of superalloy cladding material is desired, the powdered material may contain metal powder, either as a separate layer placed under a layer of powdered flux material, or mixed with the powdered flux material, or combined with the flux material into composite particles, such that the melting forms the layer of cladding material on the surface. Optionally, a feed material may be introduced into the melt pool in place of or in addition to the alloy material in the powder.

The powder material is not to be electrically conductive to an extent that it interferes with the formation of the desired arc. Flux materials which could be used include commercially available SAW fluxes such as those sold under the names Lincolnweld P2007 and Special Metals NT100. The flux particles may be ground to a desired smaller mesh size range before use. Any of the currently available iron, nickel or cobalt based superalloys that are routinely used for high temperature applications such as gas turbine engines may be joined, repaired or coated with the inventive process, including those alloys mentioned above.

It is appreciated that the advantages of utilizing powdered flux material when repairing a superalloy substrate are realized whether or not an additive cladding material is deposited. Surface cracks in a superalloy substrate may be repaired by covering the surface with powdered flux material, then melting the surface and the flux material with an arc from a non-consumable electrode to form a melt pool with a floating slag layer. Upon solidification of the melt pool under the protection of the slag layer, a renewed surface with no cracks will be formed.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A method comprising:
    depositing a layer of powder comprising a powdered flux material onto a surface of a superalloy substrate;
    forming an arc within the layer of powder between a non-consumable electrode and the substrate;
    melting at least a portion of the flux material and a superalloy feed material with the arc to form a layer of cladding material covered by a layer of slag on the substrate; and
    allowing the cladding material to cool and to solidify under the layer of slag.

2. The method of claim 1, further comprising providing the feed material as powdered superalloy feed material within the layer of powder.

3. The method of claim 2, further comprising depositing the layer of powder as a layer of powdered superalloy feed material covered by a layer of the powdered flux material.

4. The method of claim 2, further comprising depositing the layer of powder as a mixed layer of powdered superalloy feed material and the powdered flux material.

5. The method of claim 1, further comprising depositing the layer of powder as a layer of composite particles comprising both superalloy and flux material.

6. The method of claim 1, further comprising providing the feed material in the form of solid or cored filler wire or strip.

7. The method of claim 1, further comprising providing the superalloy feed material to be a material outside a zone of weldability on a graph of aluminum content verses titanium content, the zone of weldability defined as below a line intersecting 3 wt. % aluminum on a vertical axis and 6 wt. % titanium on a horizontal axis.

8. The method of claim 1, further comprising providing no inert cover gas during the forming and melting steps.

9. The method of claim 1, further comprising providing an inert gas to cool a portion of the electrode extending above the layer of powder during the forming and melting steps.

10. The method of claim 1 performed using tungsten inert gas (TIG) welding equipment with its inert cover gas supply being inactive.

11. A method comprising:
    covering a surface of a substrate with a powdered flux material;
    forming an arc between a non-consumable electrode and the substrate under the powdered flux material to form a melt pool covered by a layer of slag on a surface of the substrate; and
    allowing the melt pool to cool under the slag to form a renewed surface.

12. The method of claim 11, further comprising melting a feed material into the melt pool with the arc to form the renewed surface as a cladding material.

13. The method of claim 12, further comprising providing the feed material to be outside a zone of weldability on a graph of aluminum content verses titanium content, the zone of weldability defined as below a line intersecting 3 wt. % aluminum on a vertical axis and 6 wt. % titanium on a horizontal axis.

14. The method of claim 12, further comprising providing the feed material as a powdered feed material.

15. The method of claim 14, further comprising providing a layer of the powdered feed material on the substrate covered by a layer of the powdered flux material.

16. The method of claim 14, further comprising providing a layer comprising a mixture of the powdered feed material and the powdered flux material.

17. The method of claim 11, further comprising providing no inert cover gas while forming the arc or while allowing the melt pool to cool.

18. The method of claim 12, further comprising providing the feed material as a wire.

19. The method of claim 11, further comprising providing an inert gas to cool a portion of the electrode extending above the powdered flux material while forming the arc.

20. The method of claim 11 performed using tungsten inert gas (TIG) welding equipment with its inert cover gas supply being inactive.

* * * * *